United States Patent Office 3,570,312
Patented Mar. 16, 1971

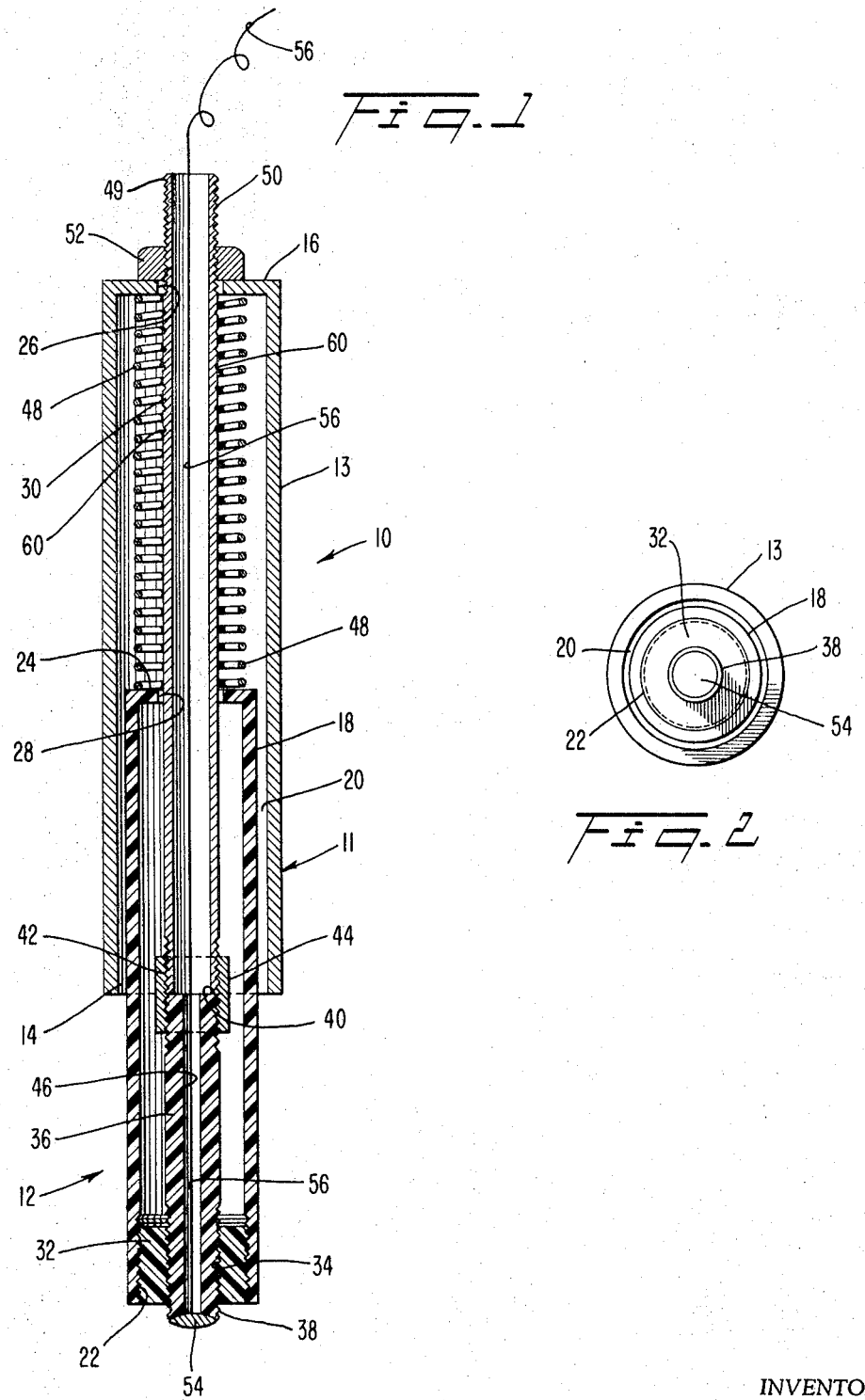

3,570,312
SKIN TEMPERATURE SENSING DEVICE
Frank Kreith, 1911 Mariposa Ave.,
Boulder, Colo. 80302
Filed June 21, 1968, Ser. No. 739,037
Int. Cl. G01k *1/08, 7/22;* G01l *1/04, 5/00;* H01c *1/02*
U.S. Cl. 73—345                                                            7 Claims

ABSTRACT OF THE DISCLOSURE

A skin temperature sensing device including a temperature sensor and a housing to manipulatively press sensor into a preselected degree of pressure contact with the surface of the skin to measure the temperature thereof. The housing has associated indicating means to visually indicate the degree contact pressure extant between said temperature sensing means and the skin surface.

---

This invention relates to a new and improved skin temperature sensing device and, more particularly but by no means exclusively, to a new and improved construction for a skin temperature sensing device which is particularly adaptable to the consistently accurate sensing of the skin temperature for medical purposes, as, for example, adjacent arthritic joints of human beings and to determine the location of tumors and the like.

Currently available contact type skin temperature sensing devices have proved to be generally unsatisfactory for the consistently accurate sensing of the skin temperature of human beings. Thus, for example, in attempts to measure the skin temperature of humans through the taping of a skin temperature sensing element against the skin, as is common in the cases of astronauts and premature babies and the like, the overlying and skin-covering tape not only distorts the localized physiological processes of the skin sufficient to effect a marked change in the ambient condition thereof sufficient to produce results different from those that would be obtained if the skin were undisturbed but also do not provide any effecitve control over the degree of pressure contact between the skin and the temperature sensing element. In other types of apparatus wherein a skin temperature sensing element in the nature of a thermocouple, thermometer or thermistor is pressed against the skin to determine the temperature of the latter, the degree of pressure contact markedly affects the results obtained. For example, if the sensing element is pressed too tightly against the skin, the resultant temperature measurement may well be affected by the temperature of the blood disposed below the skin surface rather than truly reflect the temperature of the skin surface under undisturbed conditions. Conversely, if the temperature sensing element is pressed too lightly against the skin, the influence of ambient atmospheric and surface conditions as, for example, localized perspiration evaporation or low atmospheric temperatures may distort the resultant skin temperature measurement to such an extent that the desired accurate measurement of skin temperature is rendered substantially impossible. Moreover, and even more importantly, the variances introduced into the resultant measurements by variations in contact pressure operate to preclude the comparabiliy of sequential readings either at the same or different locations since the variations of readings induced by variations in contact pressure are oftentimes appreciably larger than the temperature differences being observed.

In accordance with the principles of this invention means are provided whereby the degree of contact pressure bewteen the temperature sensing element and the skin surface being measured may be preselected by the user thereof to accommodate variations in physiological conditions and its magnitude conveniently indicated concurrently with the measurement of the skin temperature at the selected interface area. Such simultaneous indication of contact pressure and sensed temperature thus readily permits the obtaining of consistently accurate and reproducible skin temperature measurements from different skin areas of a subject whereby direct and meaningful comparisons may be made therebetween.

It is, accordingly, an object of this invention to provide a new and improved consrtuction for a skin temperature sensing device which is utilized to measure the skin temperature of subjects through the pressing of a temperature sensing element into surface contact at selectable locations therewith and proaides simultaneous measurements of both the temperature of the skin at the locus of measurement and the contact pressure extant at the point of measurement.

Another object of this invention is the provision of a readily portable skin temperature sensing device as above which is of simple and economical construction and requires the use of only readily available components and materials of proven dependability to provide for long periods of satisfactory, maintenance-free operation thereof.

Another object of this invention is to provide a portable skin temperature sensing device adapted to permit the user thereof to preselect a desired degree of cọntact pressure between the temperature sensor and the skin at the locus of measurement and to provide a visual indication of the magnitude thereof concurrently with the measurement of temperature.

As disclosed herein, a temperature sensing device constructed in accord with the principles of this invention broadly includes a support structure comprising a first member and a second member slidably mounted relative to said first member. Exposed temperature sensing means in the nature, for example, of a temperature sensing element such as a thermistor or a thermocouple or the like, are mounted on one end of said second member and biasing means are provided to normally bias said second member at a limiting position wherein said temperature sensing element is disposed remote from said first member. Progressively exposable indicating means are associated with said second member to visually indicate the positional relation of said second member relative to said first member. In operation, the first member is manually grasped and the exposed temperature sensing element is placed into surface contact with a desired skin surface location to measure the temperature thereof. Displacement of the manually grasped first member toward the skin surface results in a displacement thereof, against the force of said biasing means, relative to said second member with a concomitant increase in contact pressure between the latter and the skin surface whose magnitude will be visually indicated by the degree of progressive exposure of the indicating means. Recording means may be provided to record the measured skin temperatures at preselected contact pressures to provide a permanent record of the observed values thereof.

The above and other objects and advantages of this invention will become apparent from the following detailed description thereof taken in conjunction with the accompanying drawings wherein:

FIG. 1 is a cross-sectional view taken substantially through the longitudinal axis of a temperature sensing device constructed in accordance with the principles of this invention; and FIG. 2 is an end plan view of the device of FIG. 1.

Referring now to FIG. 1, a presently preferred embodiment of the new and improved temperature sensing device incorporating the principles of this invention is indicated generally at 10 and includes a manually graspable housing member as indicated generally at 11 and a temperature sensing element support member as indicated generally at 12. The housing member 11 may suitably constitute a tubular casing element 13 having a dependent open end, as indicated at 14, and an annular closure wall 16 at the opposite extremity thereof. The casing 13 may be made from any material of suitable rigidity and strength, with aluminum having proven particularly satisfactory in this regard additionally because of its light weight and resistance to corrosion.

The support member 12 may also suitably constitute a tubular casing element 18 sized to be slidably contained within the casing element 13, with sufficient clearance therebetween, as indicated at 20 to permit effectively unimpeded longitudinally aligned relative displacement therebetween. The inner casing 18 is formed to include a dependent open end, as indicated at 22, and an annular closure wall 24 at the opposite extremity thereof. Preferably, the inner casing 18 is also made of aluminum.

The annular closure walls 16 and 26 are shaped to define equisized longitudinally aligned apertures 26 and 28 sized to encompass an elongate tubular member 30 displaceable in conjunction with the inner casing 18 relative to the outer casing 13.

A threaded bushing 32, of insulating plastic or other suitable insulating material, is threadedly mounted in the dependent open end 22 of the inner casing 18, and includes a threaded bore 34 extending therethrough and disposed in coaxial alignment with the apertures 26 and 28. A tubular temperature sensing element support member 36 is threadably engaged in the bore 34 and the terminal dependent end portion 38 thereof extends slightly beyond the adjacent coplanar end surfaces of the bushing 32 and casing 18. The other and upper end 40 of the support member 36 is disposed in abutting relation with the adjacent dependent end 42 of the tubular member 30 within the confines of the inner casing 18, and the abutting ends 40 and 42 are connected in coaxial alignment by a coupling sleeve 44 or the like.

The extending dependent end 38 of the support member 36 is recessed to accommodate the mounting of a temperature sensing element 54 therein and an axial bore 46 extends through the support member 36 in communication therewith. A compression spring 48 is disposed intermediate the end closures 16 and 24 and in surrounding relation with the tubular member 30 and the end 49 of the latter is terminally threaded, as at 50, to support an adjustably positioned stop nut 52 exteriorly of the outer casing 13, to define one limiting position of the inner casing 12 (and elements mounted thereon) relative to the outer casing 13.

The temperature sensing element 54 preferably comprises a thermistor, which is retained in the recess 38 in any convenient manner, as, for example, by adhesion, it being noted that as utilized herein the thermistor 54 is preferably of a generally disc-like configuration, although other configurations thereof in the nature of beads or rods could also, of course, be suitably mounted in the support member 36. The thermistor 54 conventionally includes electrical leads, as indicated at 56, which extend through the bore 46 and the tubular member 50 exteriorly of the device and to an allied readout device.

Although well known and understood in this art, it is believed appropriate to briefly note that a thermistor is basically a resistor circuit component having a high negative temperature coefficient of resistance whereby the resistance thereof varies inversely with temperature, and is, in most instances, physically constituted by a stable, compact and rugged two-terminal ceramic-like semiconductor device. As utilized herein, it is preferred that the thermistor 34 be of the thin, disc-type, since thermistors of this type generally offer the advantage of low resistance, short time constants, and high power dissipation, whereby relatively rapid temperature sensing may be effected thereby. The large temperature coefficient of resistance of a thermistor renders the same ideal for temperature measurements providing the power dissipated within the thermistor is sufficiently small as to not appreciably heat it. As utilized herein, the electrical leads 56 of the thermistor 54 would, of course, be connected to suitable electrical readout components in the nature, for example, of a strip chart recorder and/or indicating means in the nature of a dial or alphanumeric display device, so that the resistance of the latter, as determined by the temperature thereof, could be utilized to provide direct recording and/or indicia of the said temperature. Although not per se forming any part of this invention, it is to be understood that circuit components in the nature of a resistance bridge would prove most suitable for converting the resistance of the thermistor 54 into indicia of the temperature thereof.

With the construction disclosed, the support member 12 which generally comprises the inner casing 18, the elongate tubular member 30 and the supporting member 36 will normally be biased in its extended position relative to the tubular casing member 11 as seen in FIG. 1 by the action of the compression spring 48 and the limiting position thereof will be determined by the position of the stop nut 52 on the extending threaded end of the tubular member 30. In like manner, any telescopic displacement of the casings 13 and 18 will be resisted by the compression spring 48 and the amount of force necessary to effect any predetermined degree of displacement may be readily preselected through utilization of springs of predetermined characteristics. In any given assemblage, however, the magnitude of displacement and concomitantly the degree of contact pressure intermediate the thermistor 54 and a skin surface is readily indicated by a scale or indicia disposed on the outer surface of the tubular member 50 which will, of course, become progressively visible as the degree of relative displacement increases.

Thus, for example, with the thermistor 54 placed in surface contact with the skin of a subject to measure the temperature thereof, a telescoping force applied to the outer casing 13 will cause it to move toward the said skin surface increasing the contact pressure and progressively exposing the indicia 60 on the end of the tubular member 30 relative to the end closure 16. While the qualitative degree of contact pressure can be directly measured by the degree of exposure of the tubular member 30, actual values thereof can be readily ascertained by calibrating the degree of displacement against the spring forces for any given type of spring or unit.

For a typical utilization of the above described skin temperature sensing device 10 in determining, for example, the temperature of the skin around an arthritically inflamed joint, the subject device 10 would be manipulated, by manual grasping of the outer casing 13, to place the thermistor 54 into initial surface contact with a preselected location on the skin adjacent the said inflamed joint, and sufficient telescoping force exerted on the said outer casing 13 to expose a predetermined calibration 60 and thus indicate, clearly and positively, that a predetermined and desired magnitude of contact pressure exists between the respective sensor thermistor 54 and the skin surface. Such contact pressure is then retained for a sufficient period of time to insure that the temperature of the thermistor 54 reached substantial equilibrium with the skin temperature as evidenced, for example, by a decreasing rate of change indicated by the temperature recording and/or indicating devices. Such operation can then be repeated at other selected locations under the same operating conditions to obtain a plurality of comparative readings.

Although the duration of the time period for which the thermistor 54 must be maintained in surface contact with the skin surface in order to provide for substantial temperature equilibrium therebetween, and thus provide for accurate object temperature measurement, will vary somewhat depending upon the initial temperature difference between the thermistor 54 and the said object, and the contact pressure utilized therebetween, this time period will usually be very short since the differences between skin temperatures and ambient temperature will usually be quite small.

For example, upon the completion of the above described measurement of the skin temperature adjacent an inflamed joint, the device 10 would be removed for application as described above to another location, it being noted that the fast response time of the thermistor 54 to temperature changes, and the use of temperature recording and/or temperature indicating means with similarly fast response times, will also function to render the requisite thermistor skin contact time relatively short. Since temperature recording means in the nature of a strip chart recorder are preferably provided, observation of the indicated thermistor-skin contact pressure, as indicated by the calibrations 60, will only be necessary during the skin temperature sensing procedure.

It will be apparent that many modifications and variations, other than those specifically noted hereinabove, may be made in the disclosed embodiment of the invention without departing from the spirit and scope thereof as defined in the appended claims.

What is claimed is:

1. A skin temperature sensing device comprising, temperature sensing means adapted to be pressed into contact with the skin surface of a subject to measure the temperature thereof and indicating means responsive to the degree of pressure contact between said sensing means and the skin surface engaged thereby for indicating the magnitude thereof.

2. In a skin temperature sensing device as in claim 1 wherein, said temperature sensing means is a thermistor.

3. A skin temperature sensing device as set forth in claim 1 including
   means for terminally supporting said temperature sensing means,
   manually graspable housing means displaceable relative to said supporting means intermediate an extended and retracted position,
   and means disposed intermediate said supporting means and said housing means for normally biasing the same to said extended position.

4. A skin temperature sensing device as set forth in claim 3 wherein said indicating means is cooperatively associated with said support means and is progressively exposed in accordance with the magnitude of displacement of said housing means relative to said support means against the action of said biasing means.

5. In a temperature sensing device as in claim 4 wherein, said temperature sensing means is a thermistor.

6. A temperature sensing device as set forth in claim 4 wherein, said housing means comprises an outer casing and said supporting means comprises a complementally shaped inner casing which is telescopically mounted within said outer casing, an extending temperature sensing means mounting means mounted in the end of said inner casing disposed remote from said outer casing, and a tubular member extending from the other end of said inner casing through and beyond said outer casing, and said biasing means comprises a spring interposed between said respective inner and outer casings to bias said casings in extending relation, and said indicating means includes indicia formed on said tubular member and operable to indicate the distance which said inner casing has been displaced relative to said outer casing against the action of said biasing spring.

7. A temperature sensing device as set forth in claim 6 wherein, said temperature sensing means is a thermistor.

References Cited
UNITED STATES PATENTS 2,195,019   3/1940   Bloomheart _____ 73—362
3,391,691   7/1968   Young _____ 73—388X S. CLEMENT SWISHER, Primary Examiner F. SHOON, Assistant Examiner U.S. Cl. X.R.

73—362, 388; 338—28